(12) United States Patent
Zuehlsdorff

(10) Patent No.: US 7,542,744 B2
(45) Date of Patent: Jun. 2, 2009

(54) MULTIMEDIA TERMINAL

(75) Inventor: Sven Zuehlsdorff, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 10/558,215

(22) PCT Filed: Apr. 30, 2004

(86) PCT No.: PCT/EP2004/050668

§ 371 (c)(1),
(2), (4) Date: Aug. 21, 2006

(87) PCT Pub. No.: WO2004/105262

PCT Pub. Date: Dec. 2, 2004

(65) Prior Publication Data

US 2007/0042731 A1    Feb. 22, 2007

(30) Foreign Application Priority Data

May 23, 2003    (DE)    ................... 103 23 467

(51) Int. Cl.
*H04B 1/08*    (2006.01)
(52) U.S. Cl. ............... 455/151.2; 455/348; 455/352
(58) Field of Classification Search ............... 455/90.3, 455/347, 348, 351, 352, 151.1, 151.2, 346, 455/247
See application file for complete search history.

(56) References Cited

U.S. PATENT DOCUMENTS

| | | | | |
|---|---|---|---|---|
| 5,109,420 A | * | 4/1992 | Nonaka | .................. 381/86 |
| 5,349,326 A | * | 9/1994 | Yamada | ............... 340/426.34 |
| 5,537,673 A | * | 7/1996 | Nagashima et al. | ......... 455/346 |
| 5,867,774 A | | 2/1999 | Summers et al. | |
| 6,115,618 A | * | 9/2000 | Lebby et al. | ............... 455/566 |
| 6,483,428 B1 | * | 11/2002 | Fish et al. | ............... 340/425.5 |
| 6,650,026 B2 | * | 11/2003 | Arai et al. | .................. 307/10.2 |
| 6,871,060 B1 | * | 3/2005 | Strohmeier | ............... 455/345 |
| 2003/0114133 A1 | * | 6/2003 | Enners | .................. 455/344 |
| 2007/0042809 A1 | * | 2/2007 | Angelhag | ............... 455/569.1 |

FOREIGN PATENT DOCUMENTS

DE    196 48 910    6/1998
DE    100 49 848    4/2002

OTHER PUBLICATIONS

Sony Ericsson R380 User's Manual, Dec. 2001 (found on the internet), pp. 9-10, 22-5.

* cited by examiner

*Primary Examiner*—Blane J Jackson
(74) *Attorney, Agent, or Firm*—Kenyon & Kenyon LLP

(57) ABSTRACT

In the described multimedia terminal, a car radio in particular, including a display unit and an operator unit, the operator unit being removable from the multimedia terminal and having operating elements for controlling the multimedia terminal, the operator unit is a remote transmission unit for wireless transmission of control signals to the multimedia terminal, the control signals being able to be generated by using the operating elements.

9 Claims, 1 Drawing Sheet

MULTIMEDIA TERMINAL

FIELD OF THE INVENTION

The present invention relates to a multimedia terminal, a car radio in particular, including a display unit and an operator unit, the operator unit being removable from the multimedia terminal and having operating elements for controlling the multimedia terminal.

BACKGROUND INFORMATION

Car radios are widely known in which an operator unit having operating elements essential for controlling the car radio, such as station keys, is removable from the front of the car radio. The removable operator unit may be quickly and easily inserted and removed and theft of the car radio, which is inoperable without the operator unit, may be prevented in this way.

Moreover, remote controls for controlling diverse functions which are separate from the multimedia terminal are widely known. The remote controls for controlling car radios may be installed in a vehicle's steering wheel, or on a separate swan neck, or they may be installed in the center console area or stored there. Due to the different installation situations and space conditions of different vehicle types, there is disadvantageously no universally usable mounting location for retrofittable remote controls.

In addition, space-using devices, such as a release panel, a release button, and a release mechanism, are required in the car radio for anti-theft protection.

Furthermore, there is the problem in conventional multimedia terminals that the size of the available display unit is extremely limited due to the number of operating elements of the operator unit necessary for operation. This results in the fact that the display unit is generally relatively small and thus poorly readable and only able to display a small number of pieces of information. Different user groups have different requirements regarding the operation, the size, and the content of the display unit. The unpracticed user needs only the information necessary for operation, whereas an advanced and technologically adept user is capable of commanding substantially more complex operating situations, following menu structures of an operator interface in particular. A larger display unit is necessary to display more extensive information, such as a menu structure.

SUMMARY OF THE INVENTION

Therefore, it is an object of the present invention to provide an improved multimedia terminal having a removable operator unit, which is universally usable, prevents theft, and is adapted to the requirements of different user groups.

According to the present invention, an object is achieved using the generic multimedia terminal in that the operator unit has a remote transmission unit for wireless transmission of control signals to the multimedia terminal, the signals being able to be generated by using the operating elements.

By designing the removable operator unit as a remote control, anti-theft protection as well as a universally usable remote control is provided with the aid of the remote transmission unit. The remote control improves the available space for the display unit when the remote control is removed from the multimedia terminal. The advanced user may thus be provided with more information than an unpracticed user who uses the multimedia terminal without the remote control and with the operator unit coupled to the multimedia terminal.

Contacts for the operator unit are preferably situated on an operating front of the multimedia terminal in such a way that the operating element is detachably mechanically and electrically mountable on the multimedia terminal at the contacts. As a result, the operator unit may easily be clamped onto the operating front and contacted electrically at the same time without requiring further space-using devices.

It is advantageous when the operator unit partly overlaps the display unit and when the multimedia terminal is designed for switching the display unit to a reduced display mode when the operator unit is mounted on the multimedia terminal. This provides an automatic switch from one operating mode, e.g., for advanced users, to an operating mode for unpracticed users when the operator unit is clamped onto the operating front. The operator unit then forms an integral part of the multimedia terminal which restricts the available surface area of the display unit. However, due to the reduced display mode, information necessary for operation is still visibly displayed to the user, without the information being obscured by the operator unit.

The display unit is preferably designed for indicating control instructions which are assigned to immediately adjacent operating elements of the operator unit coupled to the operating front in front of the display unit. This makes it possible to universally label the operating elements via the display unit, forming what are known as soft keys. In the mounted state of the operator unit, the labeling on the display unit indicates in each case the meaning or function of the soft key directly alongside the operating elements of the operator unit. To clarify the assignment of the labeling to the soft key, a luminous point may be provided at the edge of each soft key.

In the removed state of the operator unit (remote control function), the luminous point key labeling, implemented via an LED for example, switches to text information which is situated directly on the operating element. The soft key system is thereby deactivated and operation takes place exclusively via the operating elements of the operator unit whose function is fixed.

This has the additional advantage that the assignment of the control functions to the operating elements is changeable, e.g., when a menu structure is run through.

It is particularly advantageous when a coupling unit, which is separate from and wired to the multimedia terminal, is provided for mechanically and electrically accommodating the operator unit. Such a coupling unit may be a receptacle for the operator unit mounted in any position in the motor vehicle, e.g., in the center console, the power supply of the operator unit and the transmission of the control signals from the coupling unit to the multimedia terminal being ensured via a cable.

The remote transmission unit may have a wireless radio interface, or preferably an infrared interface, or the like.

DETAILED DESCRIPTION

Figure 1:
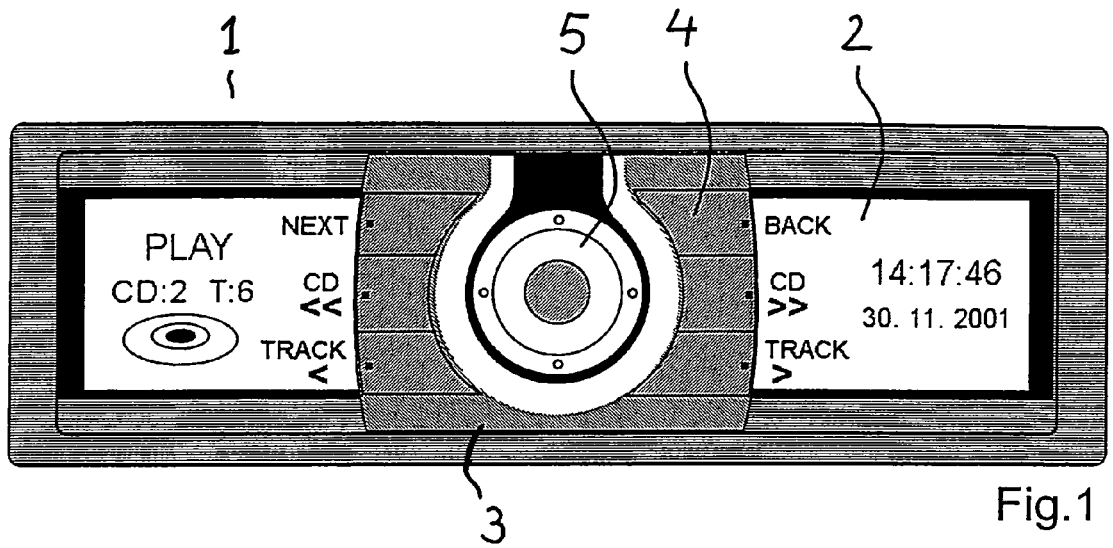
FIG. 1 shows a front view of a car radio including a coupled operator unit in front of the display unit.

FIG. 1 shows a front view of a car radio 1 whose operating front is essentially formed by a display unit 2. An operator unit 3 as a removable remote control is mountable on display unit 2, and the operator unit is detachably mechanically and electrically connected to car radio 1 via contacts 4 shown in FIG. 2. Operator unit 3 has multiple operating elements 4 in the form of keys and preferably a rotary knob 5 which may be used, for example, for running through a menu structure and which may also be used for regulating the volume, etc.

In the state shown in FIG. 1 in which operator unit 3 is mounted on the operating front of car radio 1, display unit 2 is switched to the reduced display mode. The indicated information is reduced to a degree necessary for operation by an unpracticed user. Directly alongside operating elements 4, display unit 2 additionally indicates control instructions such as "NEXT," "CD <<," "TRACK<," "BACK," "CD>>," and "TRACK>" for fast-forward and rewind during playback of a compact disc or for selecting the next or the previous title. In this way, different control instructions may be assigned to operating elements 4, depending on which functionality of the multimedia terminal is needed.

Figure 2:
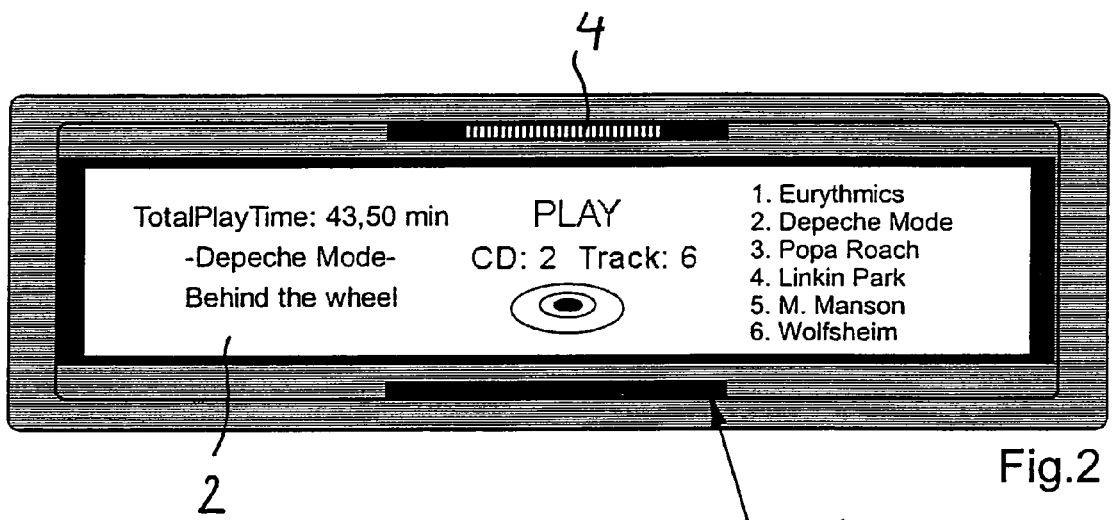
FIG. 2 shows a front view of the car radio in FIG. 1 with the operator unit removed.

FIG. 2 shows the front view of car radio 1 in FIG. 1 with operator unit 3 removed. Display unit 2 is switched to an extended display mode. It is recognizable that the entire surface area of the display unit is now used to indicate more extensive information. This may be a menu structure, for example, or, as shown in this example, the titles of pieces of music stored on a compact disc.

Figure 3:
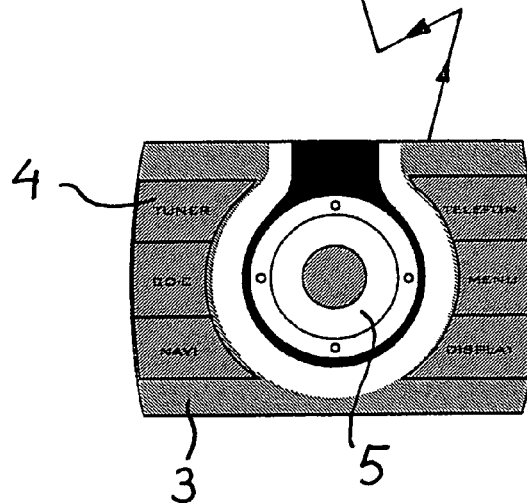
FIG. 3 shows a front view of the operator unit in FIG. 1.

FIG. 3 shows operator unit 3 removed from car radio 1. The operator unit has a remote transmission unit (not shown) via which the control signals, generated by using operating elements 4, are transmitted to car radio 1. Therefore, operator unit 3 is not only removable in a conventionally known manner for anti-theft protection, but is simultaneously usable as a remote control. The remote transmission unit may be designed, for example, as a radio interface, or an infrared interface, or the like. For this purpose, an appropriate remote transmitter is integrated into operator unit 3 and an appropriate remote receiver is integrated into car radio 1.

To accommodate operator unit 3, an additional coupling unit may optionally be integrated in a motor vehicle, in the center console, for example. The coupling unit has a power supply connection in order to supply operator unit 3 with power and may additionally establish a cable connection to car radio 1. By clamping operator unit 3 onto the coupling unit, the driver is provided with a convenient operating location and entire display unit 2 is made available at the same time.

When leaving the vehicle, operator unit 3 is simply removed from car radio 1 or from the separate coupling unit (not shown) and taken along. Due to the fact that car radio 1 is inoperable without operator unit 3, taking along operator unit 3 results in anti-theft protection.

What is claimed is:

1. A multimedia terminal, comprising:
a housing;
a display unit;
an operator unit that is removable from the housing; and
contacts for the operator unit situated on an operating front of the housing in such a way that the operator unit is detachably, mechanically, and electrically mountable on the housing at the contacts, wherein:
the operator unit includes operating elements for controlling the multimedia terminal;
the operator unit includes a remote transmission unit for wireless transmission of a control signal to a receiving element of the housing;
the control signal is generated by using at least one of the operating elements;
the operator unit partially overlaps the display unit; and
the multimedia terminal is designed for switching the display unit to a reduced display mode when the operator unit is mounted on the housing.

2. The multimedia terminal as recited in claim 1, wherein: the display unit indicates a control instructions assigned to directly adjacent operating elements of the operator unit coupled to an operating front in front of the display unit.

3. The multimedia terminal as recited in claim 1, further comprising:
a coupling unit, separate from and wired to the housing, for mechanically and electrically accommodating the operator unit.

4. The multimedia terminal as recited in claim 1, wherein the remote transmission unit has an infrared interface.

5. The multimedia terminal as recited in claim 1, wherein the multimedia terminal includes a car radio.

6. A multimedia terminal, comprising:
a display unit;
an operator unit that is removable from the terminal and that includes: operating elements for controlling the multimedia terminal; and a remote transmission unit for wireless transmission of a control signal to a receiving element of the terminal; and
contacts for the operator unit situated on an operating front of the terminal in such a way that the operator unit is detachably, mechanically, and electrically mountable on the terminal at the contacts, wherein:
the control signal is generated by using at least one of the operating elements;
the operator unit partially overlaps the display unit, and
the multimedia terminal is designed for switching the display unit to a reduced display mode when the operator unit is mounted on the terminal.

7. The multimedia terminal as recited in claim 6, wherein the display unit indicates control instructions assigned to directly adjacent operating elements of the operator unit coupled to the terminal in front of the display unit.

8. The multimedia terminal as recited in claim 6, wherein the remote transmission unit has an infrared interface.

9. The multimedia terminal as recited in claim 6, wherein the multimedia terminal includes a car radio.

* * * * *